(12) United States Patent
Weidinger et al.

(10) Patent No.: US 9,112,941 B2
(45) Date of Patent: Aug. 18, 2015

(54) INTELLIGENT RFID TAG IDENTIFIER

(75) Inventors: Christian Weidinger, Graz (AT); Franz Amtmann, Graz (AT)

(73) Assignee: NXP B.V., Eindhoven (NL)

( * ) Notice: Subject to any disclaimer, the term of this patent is extended or adjusted under 35 U.S.C. 154(b) by 703 days.

(21) Appl. No.: 12/975,044

(22) Filed: Dec. 21, 2010

(65) Prior Publication Data

US 2011/0163856 A1  Jul. 7, 2011

(30) Foreign Application Priority Data

Dec. 21, 2009 (EP) .................................... 09180081

(51) Int. Cl.
*H04Q 5/22* (2006.01)
*H04L 29/12* (2006.01)
*G06K 19/07* (2006.01)

(52) U.S. Cl.
CPC ........ *H04L 61/6004* (2013.01); *G06K 19/0723* (2013.01); *H04L 29/12801* (2013.01)

(58) Field of Classification Search
CPC ....................... G06K 7/10198; G06K 7/10227
See application file for complete search history.

(56) References Cited

U.S. PATENT DOCUMENTS

| | | | |
|---|---|---|---|
| 5,818,348 A * | 10/1998 | Walczak et al. ............... 340/10.3 |
| 6,853,294 B1 * | 2/2005 | Ramamurthy et al. ...... 340/10.1 |
| 2004/0145472 A1 | 7/2004 | Schmidtberg et al. |
| 2005/0134436 A1 * | 6/2005 | Brookner .................... 340/14.69 |
| 2006/0065730 A1 * | 3/2006 | Quan et al. ..................... 235/451 |
| 2006/0092016 A1 * | 5/2006 | Modes et al. ............. 340/539.13 |
| 2006/0181395 A1 * | 8/2006 | Gruszynski ................ 340/10.51 |
| 2006/0214772 A1 * | 9/2006 | Hsieh et al. ................... 340/10.2 |
| 2008/0034183 A1 * | 2/2008 | Drago et al. ................... 711/219 |
| 2008/0079540 A1 * | 4/2008 | Aull et al. ..................... 340/10.1 |
| 2008/0100329 A1 * | 5/2008 | Nguyen et al. ................. 324/765 |
| 2008/0117028 A1 * | 5/2008 | Karstens .................... 340/10.51 |
| 2008/0165007 A1 * | 7/2008 | Drago et al. ............... 340/572.1 |
| 2008/0266096 A1 * | 10/2008 | Hanebeck .................. 340/572.1 |
| 2008/0290995 A1 * | 11/2008 | Bruns et al. .................. 340/10.1 |
| 2011/0102156 A1 * | 5/2011 | Gravelle et al. ............. 340/10.6 |

FOREIGN PATENT DOCUMENTS

WO    2008/111727 A1    9/2008

OTHER PUBLICATIONS

EPC Global: Specification RFID Air Interface. EP tm Radio-Frequency Indentity Protocols Class-1 Generation-2 UHF RFID Protocol for Communications at 860 MHz-960 MHz (Version 1.0.9) Internet Citation, URL: http://www.nepc.gs1.org.sg/epcglobal/stdsdocs/EPC_class1_gen2_UHFRFID_protocol_1-0-9.pdf, (Jan. 2005).
Extended European Search Report for Patent Appln. No. 09180081.3 (Apr. 12, 2010).
Lehtonen, M. et al. "Serialized TID Numbers—A Headache or a Blessing for RFID Crackers?", IEEE International Conference on RFID, pp. 233-240 (2009).
Office Action for foreign counterpart European Patent Application No. 09180081.3 (Apr. 28, 2015).

* cited by examiner

*Primary Examiner* — Curtis King (57) ABSTRACT

The invention relates to an RFID transponder device configured for responding to a request of an RFID reader device, by sending a response (UID) comprising information for encoding a feature set of the RFID transponder device. The invention further relates to an RFID reader device and to an RFID system comprising such RFID transponder device and such RFID reader device. The invention also relates to various methods. The invention provides an RFID system, which is more flexible towards introducing new RFID transponder devices that are newly introduced to the market. The invention enables the introduction of such new devices using a sub-set of a prior defined feature set without requiring updating of the look-up tables of the RFID reader devices that are already on the market. This is achieved by directly encoding the feature set of the RFID transponder device in the response, such as in a unique identifier of the device.

17 Claims, 3 Drawing Sheets

| TGN | FTRS | TI | | | | | | | | |
|---|---|---|---|---|---|---|---|---|---|---|
| | | HEX | [7] | [6] | [5] | [4] | [3] | [2] | [1] | [0] |
| TG1 | F1 | 0x01 | 0 | 0 | 0 | 0 | 0 | 0 | 0 | 1 |
| TG2 | F1,F2 | 0x03 | 0 | 0 | 0 | 0 | 0 | 0 | 1 | 1 |
| TG3 | F2 | 0x02 | 0 | 0 | 0 | 0 | 0 | 0 | 1 | 0 |
| TG4 | F2,F3 | 0x06 | 0 | 0 | 0 | 0 | 0 | 1 | 1 | 0 |
| TG5 | F1,F3,F4 | 0x0d | 0 | 0 | 0 | 0 | 1 | 1 | 0 | 1 |
| TG6 | F2+FN | 0x22 | 0 | 0 | 1 | 0 | 0 | 0 | 1 | 0 |

| TGN | FTRS | TI | | | | | | | | |
|---|---|---|---|---|---|---|---|---|---|---|
| | | HEX | [7] | [6] | [5] | [4] | [3] | [2] | [1] | [0] |
| TG1 | F1 | 0x01 | 0 | 0 | 0 | 0 | 0 | 0 | 0 | 1 |
| TG2 | F1,F2 | 0x03 | 0 | 0 | 0 | 0 | 0 | 0 | 1 | 1 |
| TG3 | F2 | 0x02 | 0 | 0 | 0 | 0 | 0 | 0 | 1 | 0 |
| TG4 | F2,F3 | 0x06 | 0 | 0 | 0 | 0 | 0 | 1 | 1 | 0 |
| TG5 | F1,F3,F4 | 0x0d | 0 | 0 | 0 | 0 | 1 | 1 | 0 | 1 |
| TG6 | F2+FN | 0x22 | 0 | 0 | 1 | 0 | 0 | 0 | 1 | 0 |

INTELLIGENT RFID TAG IDENTIFIER

This application claims the priority under 35 U.S.C. §119 of European patent application no. 09180081.3, filed on Dec. 21, 2009, the contents of which are incorporated by reference herein.

BACKGROUND OF THE INVENTION

Today, a huge amount of personal cards is in practical use, with an increasing focus on applications requiring higher security. RFID technology was implemented as a comfortable interface for the user and world-wide standardized about one decade ago in the ISO/IEC14443 Proximity Standard. This standard, as well as all other standards in the field of RFID are considered to be well-known to the person skilled in the art. RFID technology enabled electronic passports, contactless credit cards (E-banking), access control or public transport ticketing as successful solutions being part of our daily life. The typical format of such cards is ID-1, specified in the ISO/IEC7810 standard.

A new trend is visible wherein RFID technology is being used for payment applications. In such applications contactless stickers with ISO/IEC14443 smartcard transponder chips are sticked to mobile phones, for example. Mobile Phones may have cases made of plastic, containing metal parts, or consist of metal, and may have different sizes. A typical transponder card attached to a metal plate will not operate properly, because the magnetic flux passing through the antenna coil will produce eddy currents in the metal, and these will produce an opposite H-field, which practically cancels out completely the Reader field. Thus, the contactless transponder gets no energy for operation. A ferrite foil in-between transponder loop antenna and metal case will allow a part of the magnetic flux to pass through the foil, and not contribute to the eddy currents. The result is that some H-field remains to power the transponder and allow (limited) operation. Such contactless systems operate with resonance to increase induced voltage. The antenna design must meet the criterion that resonance frequency is close to the operating carrier frequency, to have most energy. Loop antennas with ferrite will be detuned in different way by the presence of metal or plastic (~3 MHz for a practical case).

Another application of RFID technology is the replacement of UPC or EAN barcodes with RFID tags. RFID technology has a number of important advantages over the older barcode technology. They may not ever completely replace barcodes, due in part to their higher cost and the advantage of multiple data sources on the same object. The new electronic product code (EPC), along with several other schemes, is widely available at reasonable cost. The storage of data associated with tracking items requires many Terabytes. Filtering and categorizing RFID data is needed to create useful information. It is likely that goods will be tracked by the pallet using RFID tags, and at package level with Universal Product Code (UPC) or EAN from unique barcodes.

The unique identity is a mandatory requirement for RFID tags, despite special choice of the numbering scheme. RFID tag data capacity is large enough that each individual tag will have a unique code, while current bar codes are limited to a single type code for a particular product. The uniqueness of RFID tags means that a product may be tracked as it moves from location to location, finally ending up in the consumer's hands. This may help to combat theft and other forms of product loss. The tracing of products is an important feature that gets well supported with RFID tags containing a unique identity of the tag and also the serial number of the object. This may help companies to cope with quality deficiencies and resulting recall campaigns, but also contributes to concern about tracking and profiling of consumers after the sale.

It has also been proposed to use RFID for point-of-sale (POS) store checkout to replace the cashier with an automatic system which needs no barcode scanning. In the past this was not possible due to the higher cost of tags and existing POS process technologies. However, Industry Standard, a couture shop and recording studio in Ohio has successfully implemented a POS procedure that allows faster transaction throughput.

An RFID transponder device generally operates as follows. The RFID transponder device is brought within reach of an RFID reader device. The RFID reader device broadcasts an RF signal which is received by an antenna of the RFID transponder device. The RF signal triggers the RFID transponder device to send a response using the same antenna, which on its turn is received by the RFID reader device. The response of the RFID tag may vary from application to application, but generally it comprises at least one of: a state indicator, a product identifier, and a serial number.

There exist many communication protocols for the communication between the RFID reader device and the RFID transponder. An example of such protocol is laid out in the ISO15693 standard, which hereby incorporated by reference in its entirety. Whatever protocol is used, it is important that the reader device determines what are the features of the RFID transponder device. Such features are generally determined by the RFID reader device in the first communication actions with the RFID transponder device. The RFID reader generally uses a look-up table (LUT) to obtain the information about the optional & custom feature set (based upon a tag identifier within the response). However, the RFID product portfolio in the market grows rapidly.

A problem of the known RFID transponder system is that with a broader and more dynamic RFID tag product portfolio the look-up table solution turns out to be not sufficiently flexible.

SUMMARY OF THE INVENTION

It is a first object of the invention to provide an RFID transponder device which provides more flexibility with dynamic RFID transponder portfolios. It is a second object of the invention to provide an RFID system comprising such RFID transponder device. It is a third object of the invention to provide an RFID reader device configured for reading and/or writing such RFID transponder device.

The invention is defined by the independent claims. The dependent claims define advantageous embodiments.

In a first aspect, in accordance with the first object, the invention relates to an RFID transponder device configured for responding to a request of an RFID reader device, by sending a response comprising information for encoding a feature set of the RFID transponder device.

The effect of the features of the invention is as follows. In operational use the RFID transponder receives a request from a RFID reader to send its response. Such response may comprise a unique ID of the RFID transponder device. In the invention the feature set of the RFID transponder device, i.e. the features which the RFID transponder uses in its communication with the RFID reader device, is directly encoded in a specific part of the response. This information is thereby directly available to the RFID reader device at first receipt of the response. The RFID reader only needs to read the response including the information. There is no need for the RFID reader device to access a look-up table to determine which features belong to the RFID transponder device.

Expressed differently, there is no need to update the look-up table before communicating with a new RFID transponder device (having other features) which is to be released on the market, provided that at least the most crucial features are encoded in the information and recognized by the RFID reader device. Such updating of the look-up table is generally a labor-intensive time-consuming and logistically challenging job. Provided that the RFID transponder device comprises a sub-set of a pre-defined set of features, the invention renders such updating of the look-up table superfluous.

In an embodiment of the RFID transponder device in accordance with the invention the request is an anti-collision request. The response to an anti-collision request is particularly suitable for storing the feature information. Anti-collision requests are normally performed in an early stage of the communication between an RFID reader device and an RFID transponder device. In this stage the RFID reader device also determines the commands it may use to communicate with the RFID transponder device. However, it must be stressed that the invention is not limited to such embodiment per se.

In an embodiment of the RFID transponder device in accordance with the invention the response of the RFID transponder device comprises a unique ID. Using the unique ID of the RFID transponder to encode the feature set is very advantageous as this is among most important information stored on the RFID transponder device—giving it its identity and usually the vendor and model information—and therefore needs to be read out anyway for the reason of obtaining the identity or the vendor and model information.

In an embodiment of the RFID transponder device in accordance with the invention the information is encoded into a part of the unique ID corresponding with a tag identifier in the prior art. Different parts of the response are suitable for encoding the feature set into. However, the inventors have discovered that the tag identifier forms a very suitable part of the response in which the features may be encoded. The space available for the unique ID is generally limited (for example 8 bytes) and a large part of it is generally assigned to encoding a serial number. In current standards the tag identifier takes 8-12 bits which is suitable for directly encoding the features.

In an embodiment of the RFID transponder device in accordance with the invention the information comprises known-feature bits for encoding known features of the RFID transponder device. The invention is particularly advantageous for features which are very important or even essential to the communication between the RFID reader device and the RFID transponder device. Those features need to be established as soon as possible, whereas other, less important, features, may be determined at a later stage. The important features may also be classified as the known features. In this embodiment of the RFID transponder device part of the information is reserved for encoding such features. The less important features may be determined after that the look-up table of the RFID reader has been updated for example.

In an embodiment of the RFID transponder device in accordance with the invention the known-feature bits comprise a plurality of bits, wherein respective subsets of the plurality of bits are assigned to respective known features to obtain directly-coded features. This embodiment constitutes a quick and simple coding scheme for the feature set.

In an embodiment of the RFID transponder device in accordance with the invention the information further comprises other-feature bits for encoding of other features of the RFID transponder device. This embodiment is advantageous in situations where an RFID transponder device to be released comprises a feature set that differs from its predecessor, i.e. it comprises another combination of features (new features or less features). Preferably such other features are of the earlier-mentioned "less-important" category, but this is not essential. What is important is that this embodiment of the RFID transponder directly provides information to the RFID reader device that such other features are available.

In an embodiment of the RFID transponder device in accordance with the invention the other-feature bits are for encoding a presence of other features of the RFID transponder device. Knowing whether other features are available (without directly knowing which features) is already advantageous, because such information may be used by the RFID reader device to look-up which other features are present.

In an embodiment of the RFID transponder device in accordance with the invention the other-feature bits are for encoding a product generation of the RFID transponder device. In the development of new generation RFID transponder devices, the following may occur. A first version of the RFID transponder device is manufactured, having a set of known features. After some time, a second version of the RFID transponder device is manufactured, having the same set of known-features plus two additional features. Yet after some time, a third version of the RFID transponder device is manufactured, having the same set of features as the second, plus another feature. In such development it may be desirable to keep track of the RFID transponder device generation. The embodiment described in this paragraph meets this demand.

In an embodiment of the RFID transponder device in accordance with the invention the feature set (FTRS) comprises features selected from a group comprising:
- presence of the Electronic Article Surveillance (EAS) feature;
- presence of persistence bits (these bits are state flags which do not loose their state during a short time period in which the transponder is un-powered, wherein such time period is in the range of hundreds of milliseconds to seconds);
- memory organization;
- memory type;
- memory access control features;
- security features (such as authentication);
- customer privacy features;
- data rates;
- presence of specific sensors;
- presence of additional interfaces, and
- possibility of alternative anti-collision.

This list of features is not exhaustive, and moreover subject to growth in the future, i.e. new features are created.

In an embodiment of the RFID transponder device in accordance with the invention the directly-coded features are selected from a group comprising:
- presence of the Electronic Article Surveillance (EAS) feature;
- presence of persistence bits (these bits are state flags which do not loose their state during a short time period in which the transponder is un-powered, wherein such time period is in the range of seconds);
- memory organization;
- memory access control features;
- security features (such as authentication), and
- possibility of alternative anti-collision.

The features listed here are a subset of the list mentioned in the previous embodiment and may be classified as important features. It is advantageous to at least directly encode those features in the information, such that it is immediately known whether they are available.

In a second aspect, in accordance with the second object, the invention relates to an RFID system as claimed in claim 8. It must be noted that that the invention resides partly in the RFID transponder device (in which the feature set is encoded in part of the response) and partly in the RFID reader device (which must be adapted to determine the feature set by decoding this information. Therefore, the invention also relates to the combination of both components.

In an embodiment of the RFID system in accordance with the invention the RFID reader device comprises a decoder for decoding the information and a configurator for configuring the RFID reader device in correspondence with the feature set of the RFID transponder device. The RFID reader device has embodiments configured to operate with corresponding embodiments of the RFID transponder.

In a third aspect, in accordance with the third object, the invention relates to a reader device as claimed in claim 10. As already mentioned earlier the invention is applicable to the RFID reader device as such, because this device is to be configured for operating with the RFID transponder device of the invention, like a plug that is configured for cooperating with the corresponding socket.

In a fourth aspect, the invention relates to a method of operating an RFID reader device as claimed in claim 11. This method has similar embodiments and is advantageous as the corresponding embodiments of the RFID reader device.

In an embodiment of the method the response of the RFID transponder device comprises a unique ID.

In a fifth aspect, the invention relates to a computer program product comprising instructions for causing a processor to perform the method in accordance with the invention. The functionality of the RFID reader device may be conveniently implemented in software that is run on a piece of hardware.

In a sixth aspect the invention relates to a method of configuring the RFID transponder device as claimed in claim 11. Such method may be carried out during the manufacturing of the RFID transponder device. In a first embodiment of the method of configuring the known-feature bits are set and in second embodiment of the method the other-feature bits are set. Both embodiments may be combined.

In a seventh aspect the invention relates to a use of the RFID transponder device as claimed in claim 14. The inventors are the first who identified the possibility to directly determine the feature set of an RFID transponder device by decoding the information within the response. It must be noted that this is an important aspect of the invention, which is therefore claimed individually.

The combination of the carrier assembly and the RFID transponder chip is referred to as RFID transponder (device). Such RFID transponder device may be provided in different formats, such as contactless transponder cards or contactless smartcards or proximity cards or stickers (sometimes also being referred to as RFID tag). These RFID transponder devices may be applied in various different applications of which a couple are mentioned in the embodiments discussed hereinafter. The invention relates to a product provided with the RFID transponder device in accordance with the invention. The invention also relates to a consumer device provided with the RFID transponder device in accordance with the invention. Furthermore, the invention relates to a card comprising the RFID transponder device in accordance with the invention.

These and other aspects of the invention are apparent from and will be elucidated with reference to the embodiments described hereinafter.

LIST OF REFERENCE NUMERALS

RW RFID reader device/RFID reader
1 RFID transponder device/RFID tag
2 RFID transponder chip
5 tag antenna
10 analog front-end
15 matching circuit
20 rectifier circuit
30 electronic circuit (of RFID tag)
50 antenna layer/antenna
60 substrate layer (part of RFID carrier assembly 99)
99 RFID carrier assembly
100 electric circuit (of RFID reader)
105 further antenna (of RFID reader)
Vdd supply voltage
T1 first antenna terminal
T2 second antenna terminal
UID response of transponder device (unique ID, state of the device, or any other information)
IB initialization byte/header byte
MI manufacturer identification byte
TI tag identifier
SN serial number bytes
FB information (feature bits)
KFB known-feature bits
OFB other-feature bits (numbered part)
TGN tag number
TG1 first RFID tag example
TG2 second RFID tag example
TG3 third RFID tag example
TG4 fourth RFID tag example
TG5 fifth RFID tag example
TG6 sixth RFID tag example
FTRS feature set
F1 first feature
F2 second feature
F3 third feature
F4 fourth feature
[7], [6] . . . [0] individual bits of tag identifier for coding features
FN other feature(s)

DETAILED DESCRIPTION OF THE PREFERRED EMBODIMENT

RFID technology is being used in many different applications, such as electronic passports, contactless credit cards (E-banking), access control or public transport ticketing, contactless credit cards, and also product tagging (replacement of barcodes). In all such application the operation of the RFID transponder device is similar. An RFID reader device broadcasts a request to the RFID transponder, after which the RFID transponder responds with sending a response to the RFID reader. In some applications the RFID transponder may further respond with performing an action, such as controlling a further device. Over time RFID transponder devices developed having more and more features. Until now the feature sets of the RFID different transponder devices that are available on the market were stored in a look-up-table in the RFID reader device. The inventors have realized that this is not a flexible approach, because before an RFID transponder device is launched to the market the look-up-tables of the RFID reader devices have to be updated or else the RFID transponder device will not be recognized by the RFID reader and cannot be used immediately. The invention tackles this problem by directly encoding the feature set of the RFID transponder in its response, preferably its unique ID that is transmitted to the RFID reader. As a consequence, as soon as the RFID transponder sends its response to the RFID reader device, the RFID reader device can determine at least part of the feature set of the RFID reader device without having to consult a look-up-table first. As will become apparent from the description of the figures there are embodiments in which the feature set is divided into a part comprising very important or essential features, another part comprises less important features (both feature types may be standardized), which may be determined at a later time. These embodiments provide even more flexibility, because the RFID transponder device may be launched on the market before the RFID reader devices that are already on the market are adapted to be able to retrieve the feature set from their look-up table. This approach is especially suitable for bringing a platform product to the market, having all possible functionality on one silicon device and providing commercial derivatives (new products w/o silicon change but by reconfiguration) as the market demands.

The invention is applicable to RFID technology in general. Many different variants and technologies exist, which are not discussed in detail in this description. More information about these technologies is to be found in books, such as the book from Dominique Paret, "*RFID and Contactless Smartcard applications*", Wiley, ISBN 0470011955, but also in the "*RFID Handbook*" of Klaus Finkenzeller, Carl Hanser Verlag München Wien, ISBN 3-446-22071-2.

In order to facilitate the discussion of the detailed embodiments a few expressions are defined hereinafter.

Throughout this description the term "carrier assembly" refers to a carrier device onto which or into which an RFID transponder device is provided. Such carrier assembly may take the form of a sticker or a flexible card, for example. The carrier assembly generally comprises the antenna for the RFID transponder device.

Throughout this description the term "consumer device" refers to both electronic as well as non-electronic consumer products. In particular in the field of barcodes it is not essential that the device is electronic. RFID transponder cards are often integrated into or sticked onto electronic consumer devices, such as mobile phones.

Figure 1:
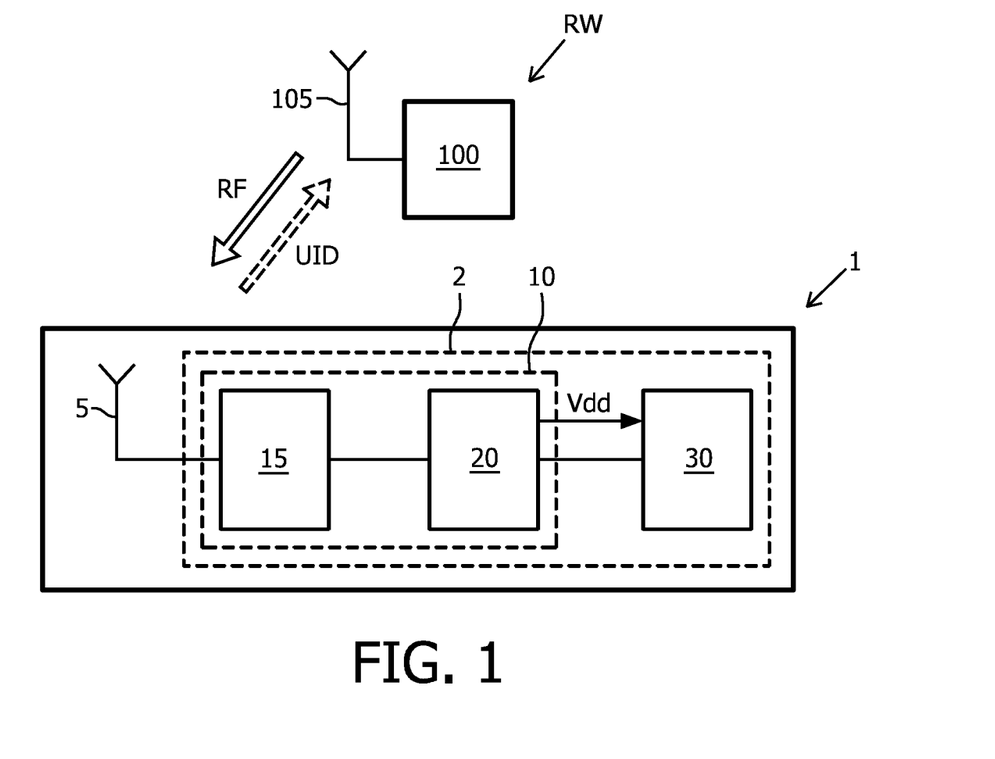
FIG. 1 shows an RFID system as known from the prior art.

FIG. 1 shows an RFID system as known from the prior art. The RFID system comprises an RFID transponder device 1 (also being referred to as RFID tag) and a RFID-reader device RW (also being referred to as RFID reader) for reading and/or writing the RFID-tag. The RFID tag 1 comprises a tag antenna 5 for receiving an RF signal (a request RF) from the RFID-reader RW, a front-end circuit 10, and an electronic circuit 30. The tag antenna 5 is electrically connected to the front-end circuit 10, and the front-end circuit 10 is electrically connected to the electronic circuit 30. The electronic circuit 30 comprises different components, such as: coding and decoding circuitry (not shown), a digital circuit or processing unit (not shown), and a memory block (not shown) for storing specific data, i.e. identification data. The front-end circuit 10 and the electronic circuit are typically comprised in an RFID transponder chip 2, whereas the tag antenna 5 is typically provided on a carrier assembly on which the RFID transponder chip 2 is mounted. Independent of the used frequency (LF, HF, UHF, etc.) the tag antenna may be a loop antenna, a dipole or a combination of various antenna types, depending on the application.

The front-end circuit 10 comprises a matching circuit 15 that is electrically connected between the tag antenna 5 and a rectifier circuit 20. The matching circuit 15 is arranged for impedance-matching of the tag antenna 5. An output signal (still an RF signal) of the matching circuit 15 is supplied to the rectifier circuit 20. The main task of the rectifier circuit 20 is to convert the RF output signal of the matching circuit 15 into a supply voltage Vdd (DC-voltage) for the electronic circuit 30. To this end the rectifier circuit 15 comprises a rectifying stage (not shown). In some RFID tags, this rectifying stage is merged with a charge-pump stage (not-shown) in order to boost the supply voltage Vdd on the output (the input power may be very low). This also depends on the operating frequency. For UHF-RFID (880-950 MHz) such charge-pump is a critical element. For 13 MHz RFID, no charge-pump is used, because under typical conditions the voltage from the antenna is high enough. Also, the rectifier circuit 15 may comprise a stabilization stage (not shown) for stabilizing the supply voltage Vdd on the output (the input power may be strongly fluctuating). This block is sometimes also being referred to as voltage limiter in the prior art. In 13 MHz RFID the voltage limiter is a critical element. Some of the most common problems encountered when designing the analog front-end 10 of the RFID-tag 1 are: i) the matching properties of the matching circuit 15 with the tag antenna 5, ii) the power consumption in the rectifier circuit 20, and iii) the low conversion efficiency of the rectifier circuit 20. The RFID reader RW comprises a further antenna 105 and an electronic circuit 100. In operation the RFID reader RW broadcasts a request to the RFID tag 1, after which the RFID tag 1 responds with sending a response comprising the unique identifier UID to the RFID reader RW. The components and the operation of the RFID tag 1 and the RFID reader RW are well-known to the person skilled in the art and are not discussed in more detail in this description. Also, variations of the RFID tag 1 have been disclosed in the prior art.

Figure 2A:
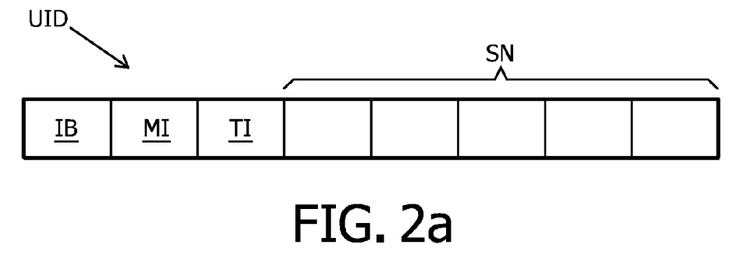
FIG. 2*a* shows a structure of a unique ID that is send by RFID transponder device of the prior art.

FIG. 2a shows a structure of a unique identifier UID that is sent by RFID transponder device of the prior art. The length of such unique identifier UID is generally laid down in standards, for example the ISO15693 standard, which is hereby incorporated by reference in its entirety. FIG. 2a gives an example that complies with this standard. The unique identifier UID comprises 8 bytes. The first byte is an initialization byte IB which, in accordance with the standard, contains the following bit sequence "11100000" (also presented as 0×E0 in hexadecimal format). The second byte is a manufacturer identifier MI which contains in this example the bit sequence "00000100" (0×04 in hexadecimal format). This manufacturer identifier MI corresponds with the firm NXP. The third byte is the tag identifier TI. In the prior art the tag identifier is a series of bits forming a number uniquely identifying tags with the same properties. This tag identifier is used in the RFID reader device to look up the corresponding feature set of the tag in the look-up table. The next five bytes (fourth until the eight byte) contain a serial number SN of the RFID transponder chip.

The inventors have realized that the unique ID is very suitable for directly encoding the feature set of the RFID transponder device, and in particular the tag identifier TI thereof. However, the invention is not limited to such implementation. Other standards may allow other parts of the response to be reserved for encoding the feature set. In the rest of the description, by way of example embodiment, the tag identifier TI is used for encoding the feature set of the transponder device.

Figure 2B:
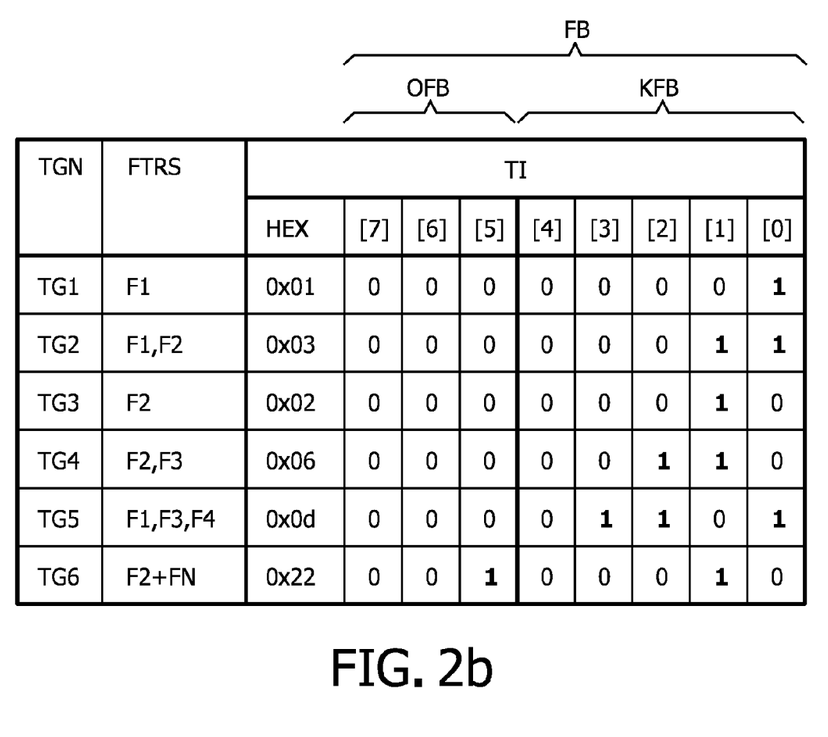
FIG. 2*b* shows a table which illustrates the invention in accordance with embodiments of the invention.

FIG. 2b shows a table which illustrates the invention in accordance with embodiments of the invention. The table comprises a first column with the tag number TGN, a second column with a corresponding feature set FTRS, and a third compound column with the modified tag identifier TI in accordance with the invention. The compound column shows both the hexadecimal representation HEX as well as the individual bit values of the tag identifier TI. The modified tag identifier is also being referred to as the feature bits FB in this description. The tables gives 6 illustrative RFID tags Tg1, Tg2, Tg3, Tg4, Tg5, Tg6, which are only given to illustrate the invention. The invention is not limited to such examples per se. The examples are only discussed at a higher level. Examples of features have been discussed earlier in this description and are not repeated here.

The first tag TG1 only comprises a first feature F1. The least significant bit [0] of the feature bits FB is therefore set to "1", while the other bits are at "0".

The second tag TG2 comprises the first feature F1 and a second feature F2. The two least-significant bits [1], [0] are set to "1", while the other bits are at "0".

The third tag TG3 only comprises the second feature F2. The second bit [1] is set to "1", while the other bits are at "0".

The fourth tag TG4 comprises the second feature F2 and a third feature F3. The third and the second bit [2], [1] are set to "1", while the other bits are at "0".

The fifth tag TG5 comprises the first feature F1, the third feature F3 and a fourth feature F4. The fourth, the third and the first bit [3], [2], [0] are set to "1", while the other bits are at "0".

The sixth tag TG6 illustrates an advantageous embodiment of the invention. In this embodiment the feature bits FB are divided in two groups. The first group comprises known-feature bits KFB and the second group comprises other-feature bits OFB. In the example of FIG. 2b there are five known-feature bits KFB and three other-feature bits OFB, but the size of each group is a matter of choice and may be varied without departing from the scope of the invention as claimed. The reason for making the division between these bits may be that there are very important or essential features and less important features. The very important or essential features may need to be established by the RFID reader device in order to be able to access the memory of the RFID transponder device, i.e. they are important for appropriate functioning of the RFID system. The less important features may be other features which are advantageous but not essential for being able to access the memory of the RFID transponder device. The inventor has realized that such features may be determined at a later stage, even after launch of the product on the market.

The sixth tag TG6 of FIG. 2b comprises the second feature (just like the third tag TG3). In the known-feature bits KFB (the first bit [0] until the fifth bit [4]) each bit is associated with one specific feature. In the other-feature bits OFB the same could have been implemented (which constitutes an embodiment of the invention). However, in this embodiment, in order to save space, the other-feature bits OFB (the sixth bit [5] until the eight bit [7]) form a numbered part. The numbered part indicates that the feature set of TG6 is different from TG3 although the essential features coded in the KFB are the same.

It will be apparent from the above description that the invention not only resides in the coding of the features in the response, such as the unique ID, of the transponder device, but also in the way the RFID reader interprets such response and determines the feature set there from. The RFID reader device of the prior art needs to be adapted to cooperate with RFID transponder device of the invention. In other words, the RFID reader device needs to be configured such that the respective part of the response (the tag identifier TI in FIG. 2b) is decoded and the command set of the RFID reader device (used for communication with the RFID transponder device) is configured in accordance with this feature set. The required functionality of the RFID reader device of the invention may be implemented in hardware, software or a mixture of both. In advantageous embodiments the RFID reader functionality is implemented in software as that provided the most flexible solution. In any case, the RFID reader device must be configured such that it may carry out the following method:

sending a request to the RFID transponder device 1 for sending a response UID;

receiving the response UID comprising the information FB;

decoding the information FB to obtain the feature set FTRS of the RFID transponder device 1, and accessing the RFID transponder device 1 based upon the feature set FTRS.

In as far as embodiments with other-feature bits OFS are concerned, the RFID reader device is configured to extract such bits and identify whether other features are contained in the RFID transponder device.

In the examples given in the table of FIG. 2b the known features are encoded in the known-feature bits, wherein each bit represents one feature. Thus in this example 5 known features may be encoded. It must be stressed that the invention is not limited to such coding. As a first variation one bit may be associated with multiple features, i.e. a certain feature sub-set. In any case, the five known-feature bits may be used to encode up to 32 different feature sets. And in case of "N" feature bits, this number equals "N^2". All such variations fall within the scope of the invention as claimed.

Figure 3A:
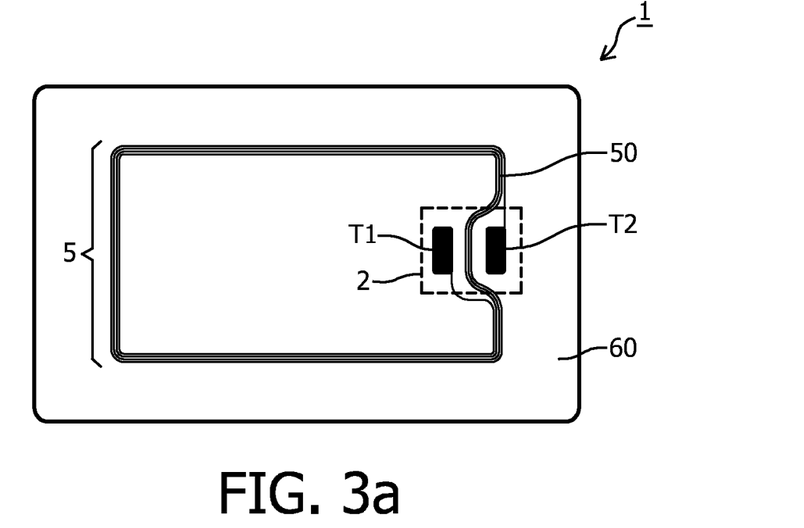
FIG. 3*a* shows a schematic top view of an embodiment of the RFID transponder device in accordance with the invention.
Figure 3B:
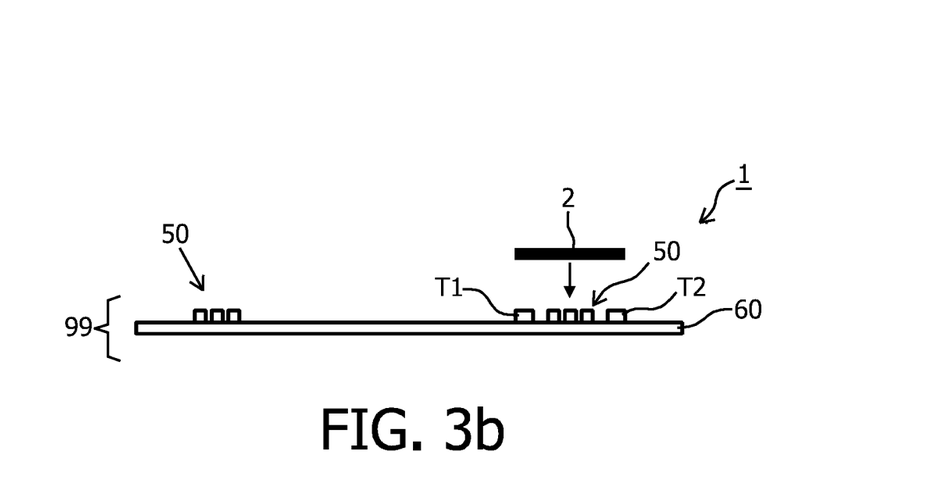
FIG. 3*b* shows a cross-sectional view of the RFID transponder device of FIG. 3*a*.

FIG. 3a shows a schematic top view of an embodiment of the RFID transponder device in accordance with the invention. FIG. 3b shows a cross-sectional view of the RFID transponder device of FIG. 3a. In this example the RFID transponder device 1 comprises a carrier assembly 99 comprising a substrate layer 60 onto which an antenna layer 50 is provided. The antenna layer 50 has been patterned to form the tag antenna 5. The tag antenna 5 in this example is a loop antenna having two terminals T1, T2 for being connected to the transponder chip 2. In other embodiments the tag antenna 5 is a dipole antenna (UHF RFID applications).

The RFID transponder device 1 in accordance with the invention may be manufactured using conventional methods. However, during such manufacturing there is required a step of setting the feature set FTRS by setting the information FB in the response UID.

The invention thus provides an RFID transponder device 1 configured for responding to a request of an RFID reader device RW, by sending a response UID comprising information FB for encoding a feature set FTRS of the RFID transponder device 1. The invention further provides an RFID reader device RW and an RFID system comprising such RFID transponder device 1 and such RFID reader device RW. The invention also provides various methods. The invention provides an RFID system, which is more flexible towards introducing new RFID transponder devices 1 using a sub-set of a prior defined feature set that are newly introduced to the market. The invention enables the introduction of such new devices without requiring updating of the look-up tables of the RFID reader devices that are already on the market. This is achieved by directly encoding the feature set of the RFID transponder device 1 in the response, such as in a unique identifier UID of the device.

The invention may be applied in various application areas. For example, the invention may be applied in RFID transponders. It must be noted that the invention is applicable to any type of transponders like active transponders, semi-passive, semi-active as well as passive transponders.

Various variations of the invention are possible and do not depart from the scope of the invention as claimed.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage. Throughout the Figures, similar or corresponding features are indicated by same reference numerals or labels.

The invention claimed is:

1. An RFID transponder device configured for responding to a request of an RFID reader device, by sending a response comprising a unique ID of the RFID transponder device, wherein a feature set of the RFID transponder device is directly encoded in the unique ID sent in the response.

2. The RFID transponder device as claimed in claim 1, wherein the request is an anti-collision request.

3. The RFID transponder device as claimed in claim 1, wherein the information comprises known-feature bits for encoding known features of the RFID transponder device.

4. The RFID transponder device as claimed in claim 3, wherein the known-feature bits comprise a plurality of bits, wherein respective subsets of the plurality of bits are assigned to respective known features to obtain directly-coded features.

5. The RFID transponder device as claimed in claim 1, wherein the information further comprises other-feature bits for encoding of other features of the RFID transponder device.

6. The RFID transponder device as claimed in claim 5, wherein the other-feature bits are for encoding a presence of other features of the RFID transponder device.

7. The RFID transponder device as claimed in claim 6, wherein the other-feature bits are for encoding a product generation of the RFID transponder device.

8. The RFID transponder device as claimed in claim 1, wherein the unique ID comprises at least one bit with a bit value, wherein the bit value directly indicates an implementation of a known feature of the RFID transponder.

9. A method of configuring the RFID transponder device as claimed in claim 1, the method comprising:
setting the feature set by setting the information in the unique ID in the response.

10. An RFID reader device configured for operating together with the RFID transponder device as claimed in claim 1, the RFID reader device being configured for reading and/or writing the RFID transponder device, and being further configured for determining the feature set of the RFID transponder device for the information in the response.

11. An RFID system comprising:
an RFID transponder device configured to transmit a unique ID of the RFID transponder device, wherein a feature set of the RFID transponder device is directly encoded in the unique ID, and
an RFID reader device for reading from and/or writing to the RFID transponder device, wherein the RFID reader device is configured to receive the unique ID transmitted by the RFID transponder device and to determine the feature set of the RFID transponder device from the unique ID transmitted by the RFID transponder device.

12. The RFID system as claimed in claim 11, wherein the RFID reader device comprises a decoder for decoding the information and a configurator for configuring the RFID reader device in correspondence with the feature set of the RFID transponder device.

13. A use of the RFID transponder device in the RFID system as claimed in claim 11, wherein the feature set of the RFID transponder device is determined by decoding the information in the unique ID in the response.

14. The RFID system as claimed in claim 11, wherein the unique ID comprises at least one bit with a bit value, wherein the bit value directly indicates an implementation of a known feature of the RFID transponder.

15. A method of operating an RFID reader device, the method comprising:
- sending a request to an RFID transponder device for sending a response;
- receiving the response from the RFID transponder device, wherein the response comprises a feature set of the RFID transponder device directly encoded in a unique ID of the RFID transponder device;
- decoding the information to obtain the feature set of the RFID transponder device, and
- accessing the RFID transponder device based upon the feature set.

16. A computer program product comprising instructions stored on the RFID reader device for causing a processor to perform the method as claimed in claim 15.

17. The method as claimed in claim 15, wherein the unique ID comprises at least one bit with a bit value, wherein the bit value directly indicates an implementation of a known feature of the RFID transponder.

* * * * *